US012728628B2

(12) United States Patent
Walker et al.

(10) Patent No.: US 12,728,628 B2

(45) Date of Patent: Sep. 8, 2026

(54) ARTICLE

(71) Applicants: Dow Global Technologies LLC, Midland, MI (US); Rohm and Haas Company, Collegeville, PA (US)

(72) Inventors: James A. Walker, Midland, MI (US); Lawrence J. Effler, Jr., Freeport, TX (US); Sudhanwa D. Dewasthale, Lake Jackson, TX (US); Amira A. Marine, Freeport, TX (US); Manesh Nadupparambil Sekharan, Lake Jackson, TX (US); Jill M. Martin, Freeport, TX (US); Mai Chen, Chicago, IL (US); Yinzhong Guo, Lake Jackson, TX (US); Christopher I. Gandy, Houston, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 531 days.

(21) Appl. No.: 18/254,161

(22) PCT Filed: Nov. 9, 2021

(86) PCT No.: PCT/US2021/058620

§ 371 (c)(1),
(2) Date: May 23, 2023

(87) PCT Pub. No.: WO2022/125246

PCT Pub. Date: Jun. 16, 2022

(65) Prior Publication Data

US 2024/0001657 A1 Jan. 4, 2024

Related U.S. Application Data

(60) Provisional application No. 63/122,683, filed on Dec. 8, 2020.

(51) Int. Cl.

| | |
|---|---|
| ***B32B 27/08*** | (2006.01) |
| ***B32B 7/12*** | (2006.01) |
| ***B32B 27/18*** | (2006.01) |
| ***B32B 27/32*** | (2006.01) |
| ***B32B 37/12*** | (2006.01) |
| ***B65D 65/40*** | (2006.01) |

(52) U.S. Cl.

CPC ................ *B32B 27/08* (2013.01); *B32B 7/12* (2013.01); *B32B 27/18* (2013.01); *B32B 27/32* (2013.01); *B32B 37/12* (2013.01); *B65D 65/40* (2013.01); *B32B 2250/05* (2013.01); *B32B 2250/242* (2013.01); *B32B 2270/00* (2013.01); *B32B 2272/00* (2013.01); *B32B 2307/414* (2013.01); *B32B 2307/54* (2013.01); *B32B 2307/558* (2013.01); *B32B 2307/5825* (2013.01); *B32B 2323/00* (2013.01); *B32B 2439/00* (2013.01)

(58) Field of Classification Search

None

See application file for complete search history.

(56) References Cited

U.S. PATENT DOCUMENTS

| | | | | |
|---|---|---|---|---|
| 2,975,483 | A * | 3/1961 | Cooper et al. ............ | B29B 9/06 264/143 |
| 10,300,686 | B2 | 5/2019 | Parkinson et al. | |
| 10,513,643 | B2 | 12/2019 | Zupancic et al. | |
| 11,802,227 | B2 | 10/2023 | Li et al. | |
| 2001/0036534 | A1* | 11/2001 | Mullen ..................... | B44F 1/02 428/179 |
| 2014/0231289 | A1* | 8/2014 | James .................... | B65D 83/00 206/389 |
| 2020/0238674 | A1 | 7/2020 | Sehanobish et al. | |
| 2020/0384750 | A1 | 12/2020 | Inagaki et al. | |
| 2021/0187790 | A1 | 6/2021 | Ohara et al. | |
| 2021/0331846 | A1 | 10/2021 | Lin et al. | |
| 2022/0282037 | A1 | 9/2022 | Si et al. | |
| 2022/0324208 | A1 | 10/2022 | Yoda et al. | |
| 2023/0234263 | A1 | 7/2023 | Sente et al. | |

FOREIGN PATENT DOCUMENTS

| | | | | |
|---|---|---|---|---|
| CA | 3056508 | A1 | 3/2020 | |
| JP | 2002/012604 | A | 1/2002 | |
| JP | 2009/227737 | A | 10/2009 | |
| WO | 2015/175871 | A1 | 11/2015 | |
| WO | WO-2016077355 | A1 * | 5/2016 | ........... C09D 167/00 |
| WO | 2019/027527 | A1 | 2/2019 | |

* cited by examiner

*Primary Examiner* — James C Yager

(74) *Attorney, Agent, or Firm* — Boyle Fredrickson S.C.

(57) ABSTRACT

An article having recyclability properties including a combination of: (a) a polyolefin polymer; and (b) a solvent-borne adhesive composition having a recyclability property, wherein the recyclability property of the solvent-borne adhesive composition is such that when the article with the solvent-borne adhesive composition is reprocessed, the article with the solvent-borne adhesive composition exhibits less than a 40% decreased change in performance compared to a control article without the solvent-borne adhesive composition that is reprocessed the same way as the article with the solvent-borne adhesive composition; a recyclable laminate structure including at least: (a) at least a first polymer film layer; and (b) a layer of the above solvent-borne laminating adhesive composition; and a process for manufacturing the above recyclable laminate structure.

12 Claims, No Drawings

ARTICLE

FIELD

The present invention is related to an article; and more specifically, the present invention is related to an article, including a combination of a polyolefin polymer and a solvent-borne laminating adhesive composition having a recyclability property.

BACKGROUND

Heretofore, the use of plastic products, for example, packaging materials for the packaging industry, has significantly increased globally. Unfortunately, the increase in demand for plastic products has created a significant increase in plastic waste because after a plastic product has been used by the consumer the plastic product is discarded by the consumer; and the plastic waste detrimentally impacts the environment in many countries around the world. To alleviate or reduce the plastic waste problem, manufacturers have attempted to produce a plastic product that can be readily recycled and reprocessed into other subsequent plastic products after the original plastic product has been used for its original purpose. However, the development of a plastic product made from an all-recyclable material has had limited success.

Typically, a plastic product, such as a laminate film structure, is a composite structure made from a combination of various different materials, some which are recyclable and some which are not. For example, WO201927527 discloses a recyclable laminate film structure which is made from all-recyclable materials such as polyethylene. However, the laminate film structure of WO201927527 also utilizes a barrier adhesive and the barrier adhesive of WO201927527 is not disclosed as being recyclable or having a recyclability property. Therefore, although WO201927527 discloses that its laminate film structure itself is considered recyclable, WO201927527 does not disclose that the barrier adhesive has a recyclability property or that the barrier adhesive meets the criteria for being recyclable. It is well known that conventional adhesives used for bonding two polymer film substrates together are usually not compatible with the polymer film substrates. Therefore, known film structures containing two incompatible component layers or an incompatible adhesive cannot be recycled "as is" because the resulting recycled material would perform poorly in the process of manufacturing a subsequent article from the recycled material. Furthermore, because the film substrate layer components are not compatible with each other, if such a two-layer (or more) multicomponent film structure containing different substrates and different adhesives is desired to be recycled by a converter, the converter is required to separate the layers from one another before recycling the layers/adhesive which makes the recycling process complicated, inefficient, and costly.

Accordingly, it is desired to provide a first plastic article comprising a combination of (1) at least one polyolefin polymer and (2) a solvent-borne laminating adhesive composition having a recyclability property and being compatible with the polyolefin polymer, such that the first article, after its original use, can be reprocessed (recycled) to form a subsequent second plastic product with sufficient performance properties to be useful as a second plastic article for various applications. Then consequently, disposing the environmentally friendly first plastic article and adding to the global plastic waste can be avoided.

SUMMARY

The present invention is directed to an article including a combination of: (a) at least one polyolefin polymer such as a polymer in the form of a film; and (b) a solvent-borne adhesive composition having a recyclability property. In some embodiments, the recyclability property of the solvent-borne adhesive composition is determined by reprocessing (recycling) the above article with the solvent-borne adhesive composition to form a reprocessed (recycled) article; and then the performance of the recycled article made from the original article with the solvent-borne adhesive composition is measured against a control article without the solvent-borne adhesive composition that is reprocessed the same way as the recycled article. The original article of the present invention has a recyclability property when the recycled article made from the original article with the solvent-borne adhesive composition exhibits less than (<) a 40 percent (%) decreased change in performance compared to the control article.

In some embodiments, the present invention includes a first article such as pellets, a monolayer or multilayer film, a monolayer or multilayer laminate, a packaging material, a molded product, and the like.

In some embodiments, the present invention includes a subsequent second article made from any one of the above first articles. In some embodiments, the second article can include, for example, plastic composites, molded goods, laminated structures, industrial films such as shrink films, stretch wrap films, and agricultural films.

In some embodiments, the present invention includes a process for producing a first article having a recyclability property comprising contacting together: (a) at least one polyolefin polymer; and (b) the above solvent-borne adhesive composition having a recyclability property.

Advantageously, the first article made incorporating the above solvent-borne adhesive composition can be subjected to a recycling process in accordance with current recyclability guidelines for the packaging industry. For example, utilizing the solvent-borne laminating adhesive composition of the present invention, which is an polyester-based system, in combination with a polymer film structure, such as an all-polyethylene (PE) high density polyethylene (HDPE) film at 2.25 grams per square meter (gsm), provides a film structure that can be reprocessed to make a new monolayer film with properties that exhibits <40% decreased change in performance relative to a control film that is reprocessed the same without any adhesive added. For example, a laminate structure made with the solvent-borne adhesive will allow a converter to: (1) mechanically reprocess the laminate structure directly, as a whole, without the need for separation of materials making up the laminate structure, and (2) generate a new film from the reprocessed laminate structure, wherein the new film has a sufficient desirable performance range.

DETAILED DESCRIPTION

Unless stated to the contrary, implicit from the context, or customary in the art, all parts and percentages are based on weight, all temperatures are in degrees Celsius (° C.), and all test methods are current as of the filing date of this disclosure.

The term "recyclable" or "recyclability" herein, with reference to a first article having an adhesive, means mechanical recyclable or recyclability; and means the first article with an adhesive is mechanically re-processable to generate a second article having a desirable performance range, wherein the second article has at least a <40% decreased change in performance relative to the performance of a control article that is without any adhesive and that is reprocessed the same way as the second article. An example, and not to be limited thereby, of testing methods and guidelines for determining recyclability of a plastic article can be found in publication "Benchmark Polyethylene Film and Flexible Packaging Innovation Test Protocol, Film-B-01" (2018) and publication "PE Film Standard Laboratory Processing Practices", Document Number FPE-P-00 (2020) of The Association of Plastic Recyclers (APR).

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (e.g., greater than [>] 50 mole percent [mol %]) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene (PE)" or "ethylene-based polymer" shall mean polymers comprising a majority amount (>50 mol %) of units which have been derived from ethylene monomer. This includes polyethylene homopolymers, ethylene/α-olefin interpolymers, and ethylene/α-olefin copolymers. Common forms of polyethylene known in the art include low density polyethylene (LDPE); linear low density polyethylene (LLDPE); ultra low density polyethylene (ULDPE); very low density polyethylene (VLDPE); medium density polyethylene (MDPE); high density polyethylene (HDPE); enhanced polyethylene; polyethylene elastomers; and polyethylene plastomers. These PE materials are generally known in the art; however, the following descriptions may be helpful in understanding the differences between some of these different PE resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 pounds per square inch (psi) (100 megapascal [MPa]) with the use of free-radical initiators, such as peroxides (see for example U.S. Pat. Nos. 8,916,667; 8,871,887; 8,822,601; 9,228,036; and 9,765,160). LDPE resins typically have a density in the range of 0.916 grams per cubic centimeter (g/cm$^3$) to 0.935 g/cm$^3$.

The term "LLDPE", includes both resins made using the traditional Ziegler-Natta catalyst systems and chromium-based catalyst systems as well as single-site catalysts, including, but not limited to, bis-metallocene catalysts (sometimes referred to as "m-LLDPE"), constrained geometry catalysts (CGC), and molecular catalysts. Resins include linear, substantially linear, or heterogeneous polyethylene copolymers or homopolymers. LLDPEs contain less long chain branching than LDPEs and includes the substantially linear ethylene polymers which are further defined in U.S. Pat. Nos. 5,272,236; 5,278,272; 5,582,923; and 5,733,155; the homogeneously branched linear ethylene polymer compositions such as those described in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization; or any combination thereof, using any type of reactor or reactor configuration known in the art.

The term "MDPE" refers to polyethylenes having densities from 0.926 g/cm$^3$ to 0.940 g/cm$^3$. "MDPE" is typically made using chromium or Ziegler-Natta catalysts or using single-site catalysts including, but not limited to, bis-metallocene catalysts, constrained geometry catalysts, and molecular catalysts; and typically have a molecular weight distribution ("MWD")>2.5.

The term "HDPE" refers to polyethylenes having densities greater than 0.940 g/cm$^3$ and up to 0.970 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 g/cm$^3$ to 0.912 g/cm$^3$, which are generally prepared with Ziegler-Natta catalysts, chrome catalysts, or single-site catalysts including, but not limited to, bis-metallocene catalysts and constrained geometry catalysts.

"Polyethylene plastomers/elastomers" are substantially linear, or linear, ethylene/α-olefin copolymers containing homogeneous short-chain branching distributions comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Polyethylene plastomers/elastomers have a density from 0.870 g/cm$^3$, or 0.880 g/cm$^3$, or 0.890 g/cm$^3$ to 0.900 g/cm$^3$, or 0.902 g/cm$^3$, or 0.904 g/cm$^3$, or 0.909 g/cm$^3$, or 0.910 g/cm$^3$, or 0.917 g/cm$^3$. Nonlimiting examples of polyethylene plastomers/elastomers include AFFINITY™ plastomers and elastomers (available from The Dow Chemical Company), EXACT Plastomers (available from ExxonMobil Chemical), TAFMER™ (available from Mitsui Chemicals), NEXLENE™ (available from SK Chemicals Co.), and LUCENE™ (available from LG Chem Ltd.); and mixtures thereof.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

An objective of the present invention is to produce a first article from original components for use in a first application; and then subsequently, after the first article is used, the used first article can be reprocessed (i.e., the used first article can be subjected to, for example, a recycling process), as a whole, to form a second article from the reprocessed first article directly. The second article can then be used in another subsequent second application.

The first article includes a combination of: (a) at least one polyolefin polymer; and (b) a solvent-borne adhesive composition. It has been surprisingly found that the solvent-borne adhesive composition used in the first article has a recyclability property which is imparted to the first article; and thus, in some embodiments, the first article is recyclable and can be used to produce the second article for various other applications.

In some non-limiting embodiments, the first article of the present invention may include, for example, one or more of the following articles: a pellet, a film such as a monolayer or multilayer film, a multilayer laminate, a packaging product, and the like. In some non-limiting embodiments, the second article of the present invention may also include, for example, one or more of the following articles: a pellet, a film such as a monolayer or multilayer film, a multilayer laminate, a packaging product, and the like.

The polyolefin polymer, component (a), useful for making the first article of the present invention can include one or more polyolefins. The first article can be, for example, a polyolefin film. Generally, the polymeric portion of the film is comprised of at least 80% of a polyolefin polymer in one embodiment, at least 85% of a polyolefin polymer in another embodiment, and at least 90% of a polyolefin polymer in still another embodiment. In one embodiment, the polyolefin polymer is at least one PE polymer. For example, the polyethylene, can include one or more of HDPE, LDPE, LLDPE, and mixtures thereof. The polyolefin film may be a monolayer or a multilayer film or may be an oriented film, oriented by machine direction orientation (MDO) or biaxially orientation processes. In another preferred embodiment, the polyolefin is polypropylene (PP), oriented PP (OPP), biaxially oriented PP (BOPP) and mixtures thereof. The non-polyolefin portion of the film may be comprised of polymers such as poly(vinyl alcohol) (EVOH) or polyamide (e.g., nylon), functionalized tie layer polymers and compatibilizers as described in U.S. Pat. No. 10,300,686.

The solvent-borne adhesive composition, component (b), useful for making the first article of the present invention can include one or more solvent-borne adhesive compositions that have a recyclability property as defined above. The solvent-borne adhesive composition is such that when the first article with the solvent-borne adhesive composition is reprocessed (recycled), the first article with the solvent-borne adhesive composition exhibits <a 40% decreased change in performance compared to a control first article without the solvent-borne adhesive composition. The first article and the control first article are both reprocessed and tested the same way to determine their respective recyclability property.

As aforementioned, the present invention can comprise a wide variety of first articles such as films, laminates, or packages and the like. Therefore, as an illustration only of the present invention, the present invention is described herein with reference to a preferred embodiment which is a monolayer or multilayer laminate structure, and more particularly, a multilayer laminate structure. It is, however, understood by one skilled in the art that many other articles can comprise the first article other than a laminate; and that the present invention is not limited thereto.

In some embodiments, the present invention includes, for example, a multilayer laminate structure; in other embodiments, the present invention includes an adhesive lamination process for manufacturing the multilayer laminate structure; and in still other embodiments, the present invention is directed to a packaging article made using the multilayer laminate structure.

In one broad embodiment, the present invention includes a multilayer laminate structure as a first article which can be used for producing a laminated packaging material that, in turn, can be recycled at the storefront for further processing. The multilayer laminate includes the combination of at least two polyolefin layer substrates adhered together by a layer of the solvent-borne adhesive composition described above. For example, the multilayer laminate structure comprises: (i) at least a first polymer film web such as a polyethylene (PE) film; (ii) at least a second polymer film web which can also be the same PE film as the first layer or a different material; and (iii) a layer of the solvent-borne polyester-based laminating adhesive composition having a recyclability property described above for bonding the first and second polyolefin film webs together; wherein the layer of the solvent-borne laminating adhesive composition is compatible with the first and second film layers; and wherein the layer of the solvent-borne laminating adhesive composition is disposed on the surface of at least one of the layers of the first film layer and the second film layer for binding the first film layer and the second film layer together. One or more other optional film layer substrates can be added to the above laminate structure with the adhesive added inbetween multiple layers to produce a multi-layer laminate structure comprising more than two layers, if desired.

The first polyolefin film web, component (i), used for making the multilayer laminate of the present invention can include one or more polyolefins. For example, the first polyolefin web, can include one or more polyolefin layers such as HDPE, LDPE, LLDPE, MDO PE, BOPE, and mixtures thereof.

In one preferred embodiment, the polyolefin film web can include oriented single or multilayer PE films made using either machine direction or biaxial orientation processes which is bonded to a second layer.

In another preferred embodiment, the polyolefin film web can be a multilayer film comprised one or more layers of HDPE, LLDPE, and LDPE.

In still another preferred embodiment, the polyolefin film web can be a PP film web or a BOPP film web.

In yet other preferred embodiments, the polyolefin film web is comprised of at least 80% of a polyolefin polymer in one embodiment, at least 85% of a polyolefin polymer in another embodiment, and 90% of a polyolefin polymer in still another embodiment. In this embodiment, non-polyolefin polymers may be used such as EVOH and polyamides as well as functional tie layers and compatibilizers as described in U.S. Pat. No. 10,300,686.

The thickness of the first polyolefin film web used to form the recyclable laminate of the present invention can be, for example, from 10 microns (μm) to 150 μm in one embodiment, from 15 μm to 100 μm in another embodiment and from 20 μm to 50 μm in still another embodiment.

The second polyolefin film web, component (ii), used for making the laminate of the present invention can include one or more polyolefins that can be the same or different from the first polyolefin film web. For example, the second polyolefin film web, can include one or more polyolefin films such as; LDPE, LLDPE, and mixtures thereof.

In one preferred embodiment, the second polyolefin film web can include, for example, a polyethylene film web which is bonded to a first web through an adhesive.

In another preferred embodiment the second film web is a multilayer structure comprising one or more layers of HDPE, LLDPE and LDPE as described in U.S. Pat. No. 9,421,743.

In still another preferred embodiment the second film web is a multilayer structure in which one layer is an EVOH or nylon layer as described in U.S. Pat. No. 10,300,686.

In yet another preferred embodiment the second film web has a metallized layer that is laminated to the first film web.

In even still another preferred embodiment the second film web outer layer is a sealant layer with a seal initiation temperature ranging from 75° C. to 100° C.

The thickness of the polyolefin film second layer used to form the recyclable laminate of the present invention can be, for example, from 10 μm to 150 μm in one embodiment, from 15 μm to 100 μm in another embodiment, and from 20 μm to 50 μm in still another embodiment.

The layer of laminating adhesive composition, component (iii), used to bind the first and second layers, components (i) and (ii), respectively, is a laminating adhesive that can advantageously be recycled after being previously used to bond the first and second layers together and forming a cured laminate structure. When an article, for example a packaging article, is manufactured from the laminate structure containing the laminating adhesive composition, the laminating adhesive composition imparts the packaging article made from the recyclable laminate structure an acceptable recyclability property to allow the packaging article, after use, to be recycled.

The solvent-borne laminating adhesive composition useful in the present invention includes, for example, polyester-based materials cured with isocyanate. In one preferred embodiment, the adhesive from a polyester polyol contains the building block that provides better compatibility with polyethylene and an isocyanate crosslinker. The building block that provides better compatibility with polyethylene can include for example, sebacid acid, azeliaid acid, adipic acid, react with a diol such as hexene diol, octene diol, and any diol with a number of carbon atoms above 6 but less than 18, and mixtures thereof. The molecular weight of the polyester is less than 90,000 in one embodiment, less than 80,000 in another embodiment, and above 50,000 in still another embodiment. The adhesive of the present invention is useful in products such as fresh and frozen produce, and general snack packaging.

The thickness/adhesive weights of the adhesive layer used to bond the first and second film webs and to form the multi-layer laminate structure of the present invention can be, for example, from 2 μm to 5 μm in one general embodiment. Any adhesive weights that are lower than 2 μm or higher than 5 μm can cause issues with adhesion resulting in failures during the remainder of the converting process.

The adhesive coating weight for the adhesive layer can be in the range of from 1.62 gsm up to 6 gsm in one general embodiment. Any adhesive weights that are lower than 1.62 gsm or higher than 6 gsm can cause issues with adhesion resulting in failures during the remainder of the converting process.

The bond value or bond strength of the adhesive, after 60 minutes (min) of lamination, may depend on the laminate structure's polyolefin film layer(s). For example, a laminate with a PE layer(s) may be greater than 50 grams per 15 millimeters (g/15 mm) in one embodiment; greater than 150 g/15 mm in another embodiment; greater than 500 g/15 mm in still another embodiment, and greater than 1,000 g/15 mm in yet another embodiment with a failure mode of film tearing. In one preferred embodiment, the bond strength of the adhesive of the present invention is, for example, from 50 g/15 mm to 2,000 g/15 mm.

The adhesive useful in the present invention has several other beneficial properties compared to other known lamination adhesives including, for example, the adhesive has superior performance with respect to clarity and runnability on lamination equipment.

The laminate structure of the present invention can include other optional layered substrates, component (iv), in addition to the above component layers (i)-(iii). For example, substrates such as EVOH, PVDC, OPA, and mixtures thereof can be laminated (bonded) to the above first and second layers, if desired.

In one general embodiment, a multilayer laminate of the present invention is produced by a process including, for example, the steps of:

(I) providing: (i) a first film substrate, (ii) a second woven fabric substrate; and (iii) an adhesive composition described above;

(II) applying the adhesive composition to at least a portion of the surface of the first or second substrate (also known as the "carrier web") to form an adhesive layer on the surface of the first or second film substrate;

(III) combining the first and second film substrates together with the adhesive layer by bringing the adhesive coated film substrate(s) together with the adhesive in contact with each of the first and second film substrates sufficient to form a laminate layer disposed in between the first and second substrates; and (IV) curing the adhesive composition, for example at room temperature (approximately [~]25° C.) or elevated temperature, in the structure of step (III) to bind the two film substrates together forming a multilayer laminate.

The application of the adhesive composition can be carried out by conventional means known in the art of applying adhesive compositions or formulation to a film substrate. For example, the adhesive composition can be applied using conventional laminating equipment and processes, including applying the adhesive using roto gravure lamination equipment with oven drying capabilities.

In addition to the recyclability property imparted to the multilayer laminate produced according to the above described process, another advantageous property exhibited by the resulting multilayer laminate can include, for example, the laminate having a substantially haze-free property. For example, MDO PE and BOPE films can have haze values of less than 8%; and standard blown films are typically higher than 8%. In one embodiment, the multilayer laminate of the present invention generally has a haze value of from 6% to 50%. In another embodiment the multilayer laminate generally has a haze value from 10% to 40%.

In general, the laminate of the present invention, prior to recycling, can be used in a wide range of applications including, for example, packaging applications for manufacturing various packaging materials and products. For example, the laminate can be used for bulk packaging of food grains/pulses, packaging of seeds, packaging of lentils and cereals, packaging of fertilizer, packaging of oilseed, packaging of sugar, packaging of salt, packaging of pharmaceuticals, packaging of other food stuff, and personal care items such as bath salts, detergent pods and the like. The film may also be used as a wrapper for baby wipes, feminine hygiene products, cereal bars, protein bars, cheese and confectionary products. When used for heavy duty packaging of food grain/pulses, the packaging article shows no signs of tunneling/de-lamination/deformation in the laminate after the adhesive cures for 24 hours (hr). Also, other advantageous features and applications for the recyclable laminate when used for packaging articles include, for example, resistance to severe weathering conditions, high tensile strength, robust drop test resistance, excellent optical appearance, and resistance to spills. The recycled materials of the present invention can also be used to reproduce non-packaging materials.

One of the advantages of the present invention is that a used virgin article (first article) made from the laminate of the present invention can be processed, i.e., processed through a recycling process. After recycling, the recycled material from the previous virgin article can be used to make a subsequent recycled laminate, and in turn a recycled article (i.e., a second article), with properties and performances very close to the previous virgin article. One objective of the present invention is to produce a second article that performs as well as, or better than, the first article, i.e. the properties of the second article performs 100% the same as, or greater than, the properties of the first article. At a minimum, the properties of the second article are maintained at a sufficient level of performance to provide a second article that is useful in another application.

For example, a new monolayer film structure (second article) made with recycled material from the recycled article (first article) can have properties that exhibits <40% decreased change in performance relative to a control film without any adhesive added that is reprocessed the same way as the virgin article. In some embodiments, the new monolayer film structure (second article) can have properties that exhibits a decreased change in performance at <40% in one embodiment, <30% in one embodiment, <25% in another embodiment, and <15% in still another embodiment. In some embodiments, the new monolayer film structure can have properties that exhibits a decreased change in performance in the range of from 0% to <40% in one embodiment, 0.01% to <40% in another embodiment, and from 0.1% to <40% in still another embodiment. In some embodiments, the new monolayer film structure can have properties that exhibits a decreased change in performance in the range of from 0% to <25% in one embodiment, 0.01% to <25% in another embodiment, and from 0.1% to <25% in still another embodiment. In some embodiments, the new monolayer film structure can have properties that exhibits a decreased change in performance in the range of from 0% to <10% in one embodiment, 0.01% to <10% in another embodiment, and from 0.1% to <10% in still another embodiment.

In a general embodiment, the process for producing a reprocessed second article from, for example, a first packaging article (i.e., the virgin article) comprises the steps of: (A) providing a first packaging article made from the laminate of the present invention; (B) fragmenting the packaging article from step (A) to produce a plurality of fragments of a predetermined size; (C) pelletizing the plurality of fragments from step (B) to form a plurality of pellets of a predetermined size; and (D) processing the pellets from step (C) to form a reprocessed second article.

In some embodiments, a third article can be produced from the reprocessed second article made by the above general process. For example, the third article can be selected from the group consisting of: pellets, monolayer or multilayer films, multilayer laminates, and packaging materials or products.

EXAMPLES

The following examples are presented to further illustrate the present invention in detail but are not to be construed as limiting the scope of the claims. Unless otherwise indicated, all parts and percentages are by weight.

Various materials used in the Inventive Examples (Inv. Ex.) and the Comparative Examples (Comp. Ex.), which follow, are explained in Table I.

TABLE I

Raw Materials

| Material | Brief Description | Supplier |
|---|---|---|
| ADCOTE ™ 102E | Polyester | The Dow Chemical Company (Dow) |
| ADCOTE ™ 577 | Polyurethane and isocyanate | Dow |
| Dow ™ CR-87-124 | Polyether polyol and polyester polyol blend | Dow |
| COREACTANT CT | Isocyanate curative | Dow |
| ELITE ™ 5960G1 | HDPE having a melt index of 0.85 decagrams per minute (dg/min) and a density of 0.962 grams per cubic centimeter (g/cc) | Dow |
| AGILITY ™ 1021 | LDPE having a melt index of 1.85 dg/min and a density of 0.920 g/cc | Dow |
| Slip MB AMPACET ™ 10090 | Erucamide masterbatch having a melt index of 1 dg/min and a density of 0.916 g/cc | Ampacet Corporation |
| AB MB AMPACET ™ 10063 | Antiblock masterbatch having a melt index of 1 dg/min and a density of 1.050 g/cc | Ampacet Corporation |

TABLE I-continued

| Raw Materials | | |
|---|---|---|
| Material | Brief Description | Supplier |
| ELITE ™ 5400G | LLDPE having a melt index of 1 dg/min and a density of 0.920 g/cc | Dow |
| AFFINITY ™ PL 1850G | Ultra linear low density polyethylene (ULLDPE) (plastomer) having a melt index of 3 dg/min and a density of 0.902 g/cc | Dow |

General Procedure for Production of Films

A sealant web film described in Table II, Sealant Web Film Structure; and a print web film described in Table III, Print Web Film Structure, are produced having seven layers; and the compositions of each of the seven layers are described in Tables II and III, respectively. The films were produced by using the following general process: Each of the films were made on a seven-layer blown film line (available from Hosokawa-Alpine). The line utilizes seven, 50 millimeter (mm) diameter, 30 L/D extruders that feed a 250 mm diameter spiral mandrel die with a 2 mm die gap. The output rate was 148 kilograms per hour (kg/hr) and the melt temperature was between 240° C. and 245° C. for layers 1-6 and between 185° C. and 200° C. for layer 7. A 2.5 blow up ratio was used in blowing the film and the film was cooled with a single lip air ring and internal bubble cooling. The line speed was ~−17 meters per minute (m/min) and the film was corona treated to an average surface energy of 43 dynes/centimeter.

TABLE II

| Sealant Web Film Structure<br>SEALANT WEB FILM<br>Gauge = 2 mil (50 μm); Layflat = 610 mm | | | |
|---|---|---|---|
| Layer | Layer Ratio | Ingredient Level | All PE Sealant Web |
| 1 | 14.0% | 86.0% | ELITE ™ 5960G1 |
| | | 10.0% | AGILITY ™ 1021 |
| | | 2.0% | Slip MB AMPACET ™ 10090 |
| | | 2.0% | AB MB AMPACET ™ 10063 |
| | | 100.0% | Total |
| 2 | 12.0% | 90.0% | ELITE ™ 5960G1 |
| | | 10.0% | AGILITY ™ 1021 |
| | | 100.0% | Total |
| 3 | 15.0% | 100.0% | ELITE ™ 5400G |
| | | 100.0% | Total |
| 4 | 13.0% | 90.0% | ELITE ™ 5960G1 |
| | | 10.0% | AGILITY ™ 1021 |
| | | 100.0% | Total |
| 5 | 13.0% | 90.0% | ELITE ™ 5960G1 |
| | | 10.0% | AGILITY ™ 1021 |
| | | 100.0% | Total |
| 6 | 13.0% | 90.0% | ELITE ™ 5960G1 |
| | | 10.0% | AGILITY ™ 1021 |
| | | 100.0% | Total |
| 7 | 20.0% | 94.0% | AFFINITY ™ PL 1850G |
| | | 2.0% | Slip MB AMPACET ™ 10090 |
| | | 4.0% | AB MB AMPACET ™ 10063 |
| | | 100.0% | Total |
| | 100% | | |

TABLE III

| Print Web Film Structure<br>PRINT WEB FILM<br>Gauge = 38 μm; Layflat = 610 mm | | | |
|---|---|---|---|
| Layer | Layer Ratio | Ingredient Level | All PE Print Web |
| 1 | 14.0% | 86.0% | ELITE ™ 5960G1 |
| | | 10.0% | AGILITY ™ 1021 |
| | | 2.0% | Slip MB AMPACET ™ 10090 |
| | | 2.0% | AB MB AMPACET ™ 10063 |
| | | 100.0% | Total |
| 2 | 12.0% | 90.0% | ELITE ™ 5960G1 |
| | | 10.0% | AGILITY ™ 1021 |
| | | 100.0% | Total |
| 3 | 15.0% | 100.0% | ELITE ™ 5400G |
| | | 100.0% | Total |
| 4 | 15.0% | 90.0% | ELITE ™ 5960G1 |
| | | 10.0% | AGILITY ™ 1021 |
| | | 100.0% | Total |
| 5 | 15.0% | 90.0% | ELITE ™5960G1 |
| | | 10.0% | AGILITY ™ 1021 |
| | | 100.0% | Total |
| 6 | 15.0% | 90.0% | ELITE ™ 5960G1 |
| | | 10.0% | AGILITY ™ 1021 |
| | | 100.0% | Total |
| 7 | 15.0% | 86.0% | ELITE ™ 5400G |
| | | 10.0% | AGILITY ™ 1021 |
| | | 2.0% | Slip MB AMPACET ™ 10090 |
| | | 2.0% | AB MB AMPACET ™ 10063 |
| | | 100.0% | Total |
| | 100% | | |

After two separate rolls of the above two films (Sealant Web Film and Print Web Film) are produced, a first set of the two films are laminated together with a waterborne adhesive composition of the present invention and a second set of the two films are laminated together with a conventional polyurethane laminating adhesive using the process "General Procedure for Film Lamination" described herein below.

Each of the resulting composite film laminates are reprocessed by shredding the films, pelletizing the films, extruding/compounding the pellets, and forming a second film from the compounded pellets originating from each of the first composite film laminates using the procedures described herein below.

Subsequently, the second films are tested using the testing procedures described herein below with the results of the testing described in Tables VI and VII.

General Procedure for Film Lamination

Lamination is accomplished by using a Super-Combi 3000 series commercial laminator (available from Nordmeccanica). The laminator has a maximum film width of 1,320 mm and a minimum film width of 600 mm. Additionally, the laminator contains 2 modular coating decks: (1) a waterborne deck for waterborne lamination and (2) a Gravure deck for water-based and solvent-based adhesives/coatings. The laminator also contains 2 zone forced air dryers and a 7.5 kilowatt (KW) corona treater (available from Enercon Industries Corporation) for both a primary film and a secondary film. The maximum line speed of the laminator is 400 meters per minute (m/min) or 1,312 feet per minute (ft/min). All unwinds use a 76 mm or a 152 mm core and rewinds use only a 152-mm core. The laminator is capable of running most packing films such as polyester, oriented polypropylene, polyethylene, nylon, paper, foil (secondary only) and others. For the purposes of the present invention, the solvent-borne laminating adhesive used in the Examples was ADCOTE™ 102E (available from The Dow Chemical Company); and the films and adhesive were run on the laminator with a target application of 2.4 gsm utilizing the Gravure deck of the laminator. Upon completion of the lamination, the rolls of film were allowed to fully cure at room temperature for 7 days.

General Procedure for Film Shredding/Pelletizing

Shredding and pelletizing are accomplished using an INTAREMA® 605 K pelletizer unit (available from EREMA). The barrel zone of the pelletizer is run at 171° C.; and the pelletizer zone is run at 176° C.

General Procedure for Compounding Blend Ratios

The pellets produced using the above pelletizer are compounded utilizing a LabTech 26 mm Twin-Screw Extruder, Type LTE26-44 (Part II). The run parameters of the above extruder are described in Table IV.

TABLE IV

LabTech 26 mm Twin-Screw Extruder Compounding Parameters

| | Run Conditions |
|---|---|
| TEMPERATURE PROFILE | |
| 26 mm LabTech Extruder | |
| Feed Throat | Chilled |
| Zone 1 Setpoint, ° C. | 177 |
| Zone 2 to Zone 10 Setpoint, ° C. | ~179-~213 |
| Die Temperature, ° C. | ~218 |
| Extruder Final Melt Temperature, ° C. | 221 |
| Approximate Pressure (kPa) | <19,305 |
| Extruder Amps (%) | 61 |
| Extruder (revolutions per minute [rpm]) | 650 |
| Hopper Feed RPM | |
| Pellet Size (mm) | 2.73 |
| Pelletizer Speed (meters per second [m/s]) | 0.34 |
| RATE | |
| Production | |
| Total Feed Rate (kilograms per second [kg/s]) | 0.0076 |
| Total Amount to make per sample, kilograms (kg) | |

Fabrication Line

Blends are generated using six Movacolor gravimetric feeders connected by a vibratory tray, which feeds a 20 mm twin-screw extruder (available from LabTech Engineering Company LTD ["LabTech" ]). Two mixing zones ensure a consistent composition at the extruder outlet. Downstream of the extruder is a 3.0 cubic centimeters per revolution ($cm^3$/rev) gear pump, which provides high, steady pressure to push material through the blown film die. A standard 5.08-cm (2-inch) diameter cylindrical spiral mandrel die (LabTech) with six spiral channels and die gap of 1.0 mm. Pressurized air inflates the film bubble to a 2.5 blow-up ratio (BUR) to 4 BUR ("BUR" is defined as maximum bubble diameter divided by die diameter). A dual lip air ring driven by a variable speed blower (Labtech) is used for all experiments. The frost line height (FLH) can vary from 127 mm to 330 mm; and is controlled by modifying blower speed and the air ring chimney. Film thickness is typically controlled within ±10% by adjusting the nip roller speed. The layflat is trimmed to a width of 150 mm (6 inches) and wound up into two rolls. The standard conditions and possible ranges of conditions are summarized in Table V.

TABLE V

Blown Film Fabrication Conditions

| Condition | Value |
|---|---|
| Twin screw speed | 300 rpm |
| Die temperature | 230° C. |
| Die gap | 1.0 mm |
| Film speed | 0.102 m/s |
| Film thickness | 2 mil |
| Die diameter | 51 mm |
| BUR | 2.5 |
| Output | 0.00189 kg/s |
| FLH | 236 mm |

Film Testing

The films prepared in the Examples were tested for the following physical properties: Dart, Tear, Secant Modulus and Tensile. The tests were conducted as described in the following ASTM test methods: ASTM D1709 was used to measure Drop Dart; ASTM D1922 was used to measure Elmendor Tear; ASTM D882 was used to measure Secant Modulus; ASTM D822 was used to measure Tensile; and ASTM D1003 was used to measure Haze.

Examples 1-3 and Comparative Examples A-D

Tables VI and VII provide the results of testing films of the present invention (Inv. Ex. 1-3) compared to the Control Film (Comp. Ex. A). The reprocessed Control Film consists of a 1:1 blend of Print Web and Sealant Web film and contains no laminating adhesive. The sample Control Film is the sample for which all laminated films are compared to.

All Laminated Containing Films were laminated to the Print Web and Sealant Web to make one resultant film. This resultant film was then shredded and pelletized and blended with multiple ratios of control pellets made from the Control Film.

The parameters of the films included the film thickness for each of the films of Inv. Ex. 1-3 and Comp. Ex. A-D which was a thickness of no more than 2 mils±0.5 mils. All other properties of the films of Inv. Ex. 1-3 cannot have more than a 40% decreased change in performance relative to the Control Film sample.

An alternative laminating adhesive used as a comparative sample was Adcote 577; and such adhesive was used in the film samples of Comparative Examples B-D.

Results

Each of the tested adhesive compositions of the present invention (Table VI, Inv. Ex. 1-3) is a solvent-borne laminating adhesive, ADCOTE™ 102E. The results described in Table VI show that the adhesive compositions of the present invention pass the "<30% decreased change in performance" test, for example, in all categories as set forth in Table VI. For instance, the Dart performance is well within the performance boundaries being no less than 40% decreased change in performance relative to the performance of Comp. Ex. A. It has been determined that the adhesive compositions of the present invention pass the recyclability test when pellets containing the adhesive compositions of the present invention are used in amounts of from 10% to 50%.

Two solvent-borne samples containing a laminating adhesive, ADCOTE™ 577/CR87-124, were tested as described in Table VII. The laminating adhesive used in Comp. Ex. B-D is a high crosslinked PU system. The samples of Comp. Ex. B-D failed the Dart test with a performance decreased change of greater than 40% (see Table VII, Comp. Ex B-D).

It is theorized that the failure of Comp. Ex. B-D is likely due to the rigidity imparted by the highly crosslinked adhesive material. The drop in Dart greater than 40% at amounts of from 10% to 50% results in the adhesive of Comp. Ex. B-D not meeting the criteria for recyclability.

TABLE VI

Examples Using Laminating Adhesive Having Recyclability

| Example No. | Thickness of Film (2 ± 0.5 mils) | No more than a 40% decreased change compared to the Control Film | | | | | | | | | | | | | |
|---|---|---|---|---|---|---|---|---|---|---|---|---|---|---|---|
| | | Haze | | Dart (J) | | Tear MD ($g_f$) | | Tear TD ($g_f$) | | 1% Secant TD (GPa) | | 1% Secant MD (GPa) | | Tensile MD (GPa) | |
| Comp. Ex. A; Control | 1.9 | 27 | | 0.914 | | 177 | | 989 | | 0.57 | | 0.56 | | 0.0181 | |
| Inv. Ex. 1 ADCOTE ™ 102E; 10% | 2.1 | 31 | 13% | 0.888 | −3% | 159 | −10% | 1060 | 7% | 0.63 | 9% | 0.55 | −1% | 0.0179 | −1% |
| Inv. Ex. 2 ADCOTE ™ 102E; 25% | 2.1 | 31 | 13% | 0.868 | −5% | 151 | −15% | 1015 | 3% | 0.64 | 11% | 0.61 | 9% | 0.0182 | 1% |
| Inv. Ex. 3 ADCOTE ™ 102E; 50% | 1.8 | 32 | 17% | 0.732 | −20% | 185 | 5% | 934 | −6% | 0.66 | 15% | 0.56 | −1% | 0.0177 | −2% |

TABLE VII

Comparative Examples Using Conventional Polyurethane Laminating Adhesive

| Example No. | Thickness of Film (2 ± 0.5 mils) | No more than a 40% decreased change compared to the Control Film | | | | | | | | | | | | | |
|---|---|---|---|---|---|---|---|---|---|---|---|---|---|---|---|
| | | Haze | | Dart (J) | | Tear MD ($g_f$) | | Tear TD ($g_f$) | | 1% Secant TD (GPa) | | 1% Secant MD (GPa) | | Tensile MD (GPa) | |
| Comp. Ex. A; Control | 1.9 | 27 | | 0.914 | | 177 | | 989 | | 0.57 | | 0.56 | | 0.0181 | |
| Comp. Ex. B ADCOTE ™ 577; 10% | 2.0 | 34 | 24% | 0.512 | −44% | 181 | 2% | 1057 | 7% | 0.59 | 2% | 0.55 | −1% | 0.0163 | −10% |
| Comp. Ex. C ADCOTE ™ 577; 25% | 2.1 | 41 | 49 | 0.428 | −53% | 150 | −15% | 467 | −53% | 0.55 | −4% | 0.52 | −8% | 0.0159 | −12% |
| Comp. Ex. D ADCOTE ™ 577; 50% | 2.0 | 50 | 82% | 0.421 | −54% | 155 | −12% | 852 | −14% | 00.49 | −15% | 0.50 | −11% | 0.0142 | −22% |

What is claimed is:

1. A second article comprising:

a melt blend of (1) from 10 wt % to 50 wt % of polymer pellets of a reprocessed first article comprising (a) polyolefin polymer consisting of polyethylene; and (b) a solvent-borne polyester-based adhesive composition; and (2) from 90 wt % to 50 wt % of polymer pellets of a reprocessed control film comprising polyolefin polymer consisting of polyethylene, wherein weight percent of (1) and (2) is based on the total weight of the second article;

wherein the polyolefin polymer in the second article consists of one or more reprocessed polyethylenes, and the second article exhibits less than a 40 percent decreased change in performance compared to a control article consisting of melt blended pellets of the reprocessed control film, the control article being substantially identical to the second article except that the control article contains no reprocessed first article.

2. The second article of claim 1, wherein the reprocessed first article comprises at least 90 wt % polyethylene.

3. The second article of claim 1, wherein the solvent-borne polyester-based adhesive includes an isocyanate crosslinker.

4. The second article of claim 1, wherein the reprocessed first article before being reprocessed is selected from the group consisting of multilayer films, multilayer laminates, packaging materials, packaging products, and combinations thereof.

5. The second article of claim 1, wherein the second article is selected from the group consisting of pellets, monolayer film, multilayer films, multilayer laminates, packaging materials, packaging products, and combinations thereof.

6. The second article of claim 1 wherein the second article is selected from the group consisting of plastic composites, molded goods, laminated structures, shrink film, stretch wrap film, agricultural film, and combinations thereof.

7. The second article of claim 2, wherein the reprocessed control film comprises at least 90 wt % of polyethylene.

8. The second article of claim 7 wherein the reprocessed control film contains no acrylic-based adhesive composition.

9. The second article of claim 8 wherein the second article comprises at least 90 wt % polyethylene.

10. The second article of claim 9 wherein the second article consists of the melt blend of (1) from 10 wt % to 50 wt % polymer pellets of the reprocessed first article; and (2) from 90 wt % to 50 wt % polymer pellets of the reprocessed control film.

11. The second article of claim 7 wherein the second article exhibits less than a 40 percent decreased change in haze compared to the control article.

12. The second article of claim 7 wherein the second article exhibits less than a 40 percent decreased change in tear compared to the control article.

* * * * *